Patented Jan. 22, 1935

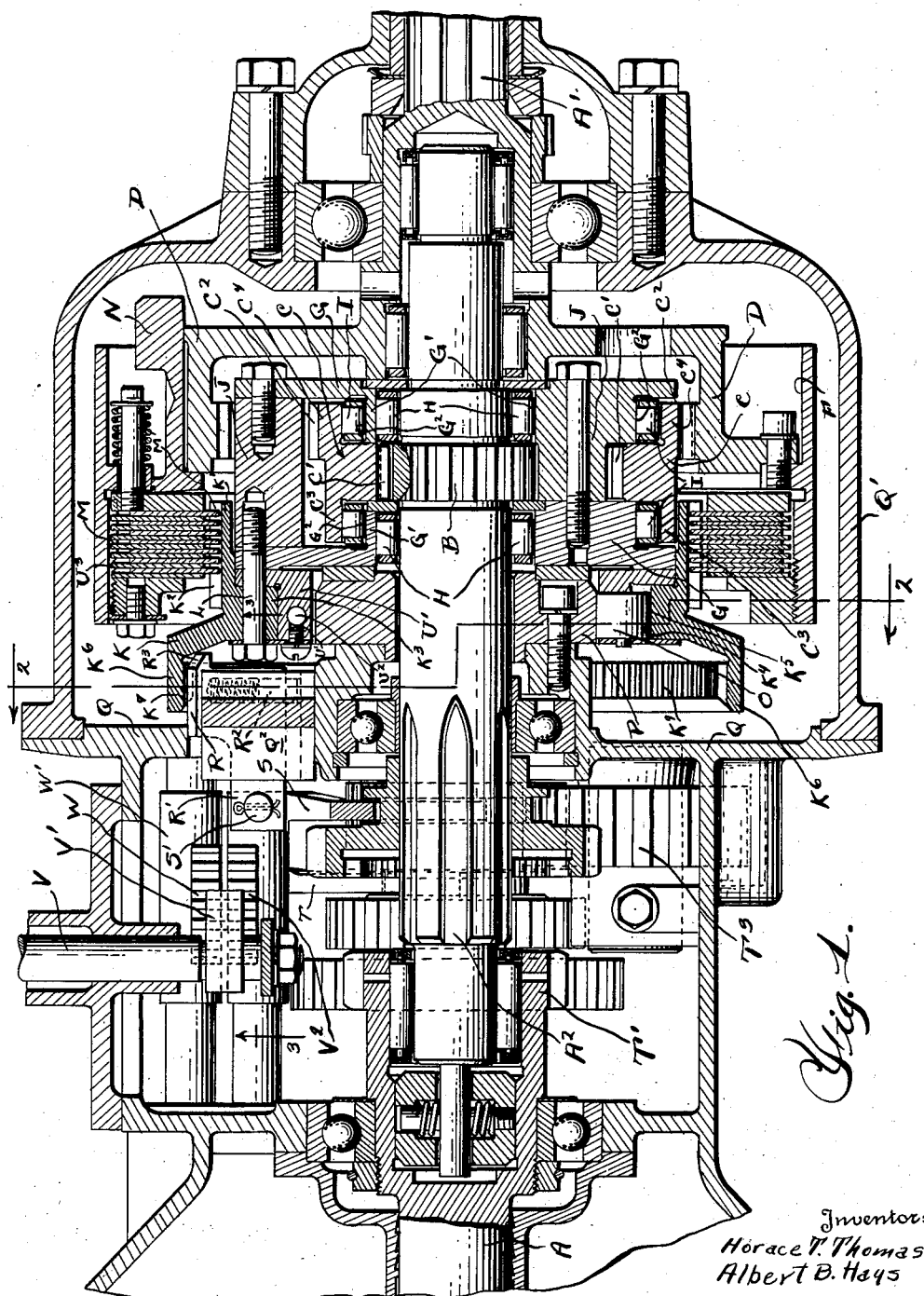

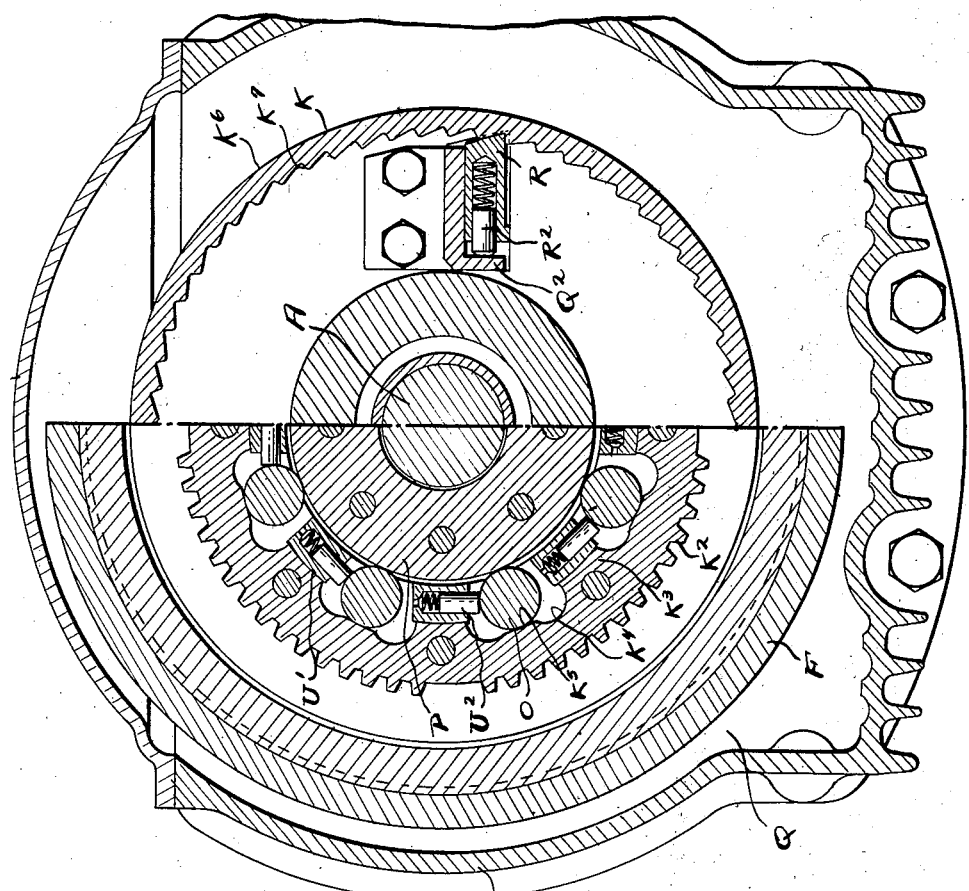
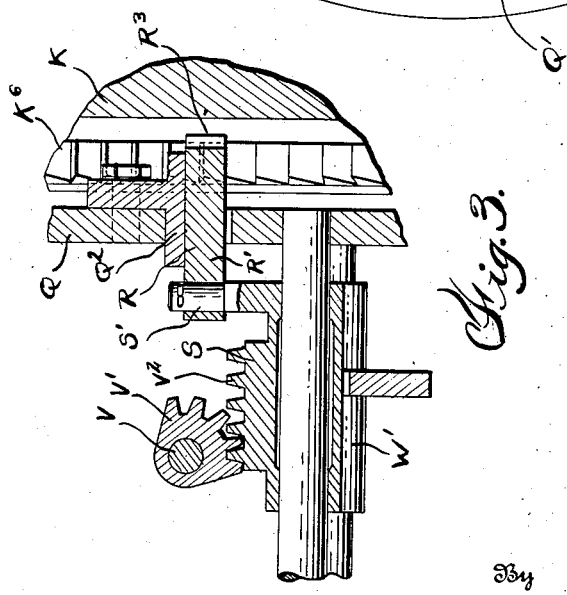

1,988,466

UNITED STATES PATENT OFFICE 1,988,466

TRANSMISSION MECHANISM

Horace T. Thomas and Albert B. Hays, Lansing, Mich., assignors to Reo Motor Car Company, a corporation of Michigan Application October 17, 1932, Serial No. 638,240
Renewed April 25, 1934

5 Claims. (Cl. 74—260)

The invention relates to transmission mechanisms more particularly designed for use on motor vehicles and of that type described in our copending application for patent Serial Number 592,580, filed February 12, 1932, and including, first, manually shiftable gears and second, an automatic variable speed transmission. The automatic variable speed transmission is of the planetary type including a planetary gear carrier which during low speed operation is held stationary. There is also provided a friction slip clutch for connecting this carrier to the driven member which is centrifugally controlled by members carried by the driven member. Thus when the vehicle is traveling at slow speed the driving is effected at low ratio through the medium of the planetary gears but as the vehicle increases in speed, the planetary gear carrier is frictionally driven forward and finally is locked to the driven member so that the whole system revolves at high speed.

To accomplish the functions just described, it is necessary that the planetary gear carrier should be held from reverse rotation, as otherwise no forward driving torque could be transmitted through the planetary gears. On the other hand, the planetary gear carrier must be free to rotate in a forward direction so that it may be frictionally driven by the clutch and finally will run at the same speed as the driven member. A further function is necessary where the automatic transmission is associated with a manually controlled reverse gearing, viz: the locking of the carrier from forward movement when the transmission is in reverse. This in constructions heretofore used results in certain complications of design.

It is the primary object of the present invention to simplify the construction and at the same time provide for a performance of all of the necessary functions. To this end the invention consists in the construction as hereinafter set forth.

In the drawings:

Fig. 1 is a horizontal section through the transmission mechanism;

Fig. 2 is a vertical transverse section substantially on line 2—2 of Fig. 1;

Fig. 3 is a vertical longitudinal section taken substantially on the line 3—3 of Fig. 1.

As many of the structural features of our improved transmission form no part of the present invention, we have omitted illustration and description of the same, showing and describing only those parts which are directly associated with the elements constituting our improvement. As illustrated, A is a drive shaft, A' a driven shaft and $A^2$ an intermediate shaft, all in axial alignment. B is a sun gear mounted on the intermediate shaft $A^2$, C is a ring gear which is eccentric in relation to the axis of said shafts and which has internal gear teeth C' in mesh with the gear B and external gear teeth $C^2$. D is a revoluble internal gear concentric with the axis of the shaft A and in mesh with the external gear teeth $C^2$ of the ring gear C. The gear D is directly connected to the driven shaft A' and it also has connected thereto a drum F enclosing a friction disk clutch which will be later described.

To retain the ring gear C in its eccentric relation to the axis of the shaft A, it is mounted upon a gear carrier which in turn is mounted to be revoluble concentric to the axis thereof. This gear carrier is in the form of a cage comprising side plates G on opposite sides of the ring gear C and which are provided with cylindrical race members G' concentric with the axis of the shaft A and supported on said shaft through the medium of roller bearings H. The plates G are also provided with eccentric race members $G^2$ for cooperating with rollers I which engage cylindrical flanges $C^3$ and $C^4$ on the ring gear C. The plates G are cross-connected by members J so fashioned as to avoid interference with the ring gear C.

With the construction as thus far described, it will be understood that the cage G forms an eccentric bearing for the ring gear C but is itself revoluble concentric to the axis of the shaft A. As the ring gear is an intermediate between the sun gear B and the internal gear D it is obvious that when the gear B is rotated in a direction to drive the vehicle forward, it will transmit motion in the same direction but at a lower speed to the internal gear D. However, to perform this function the carrier G and ring gear C must be held from reverse rotation in order to receive the reaction of the load. Also as previously described the carrier G must be normally free to revolve in a forward direction when it is frictionally driven from the gear D by the clutch while during reverse the carrier G must be locked from forward rotational movement.

To adapt the carrier G to the performance of these several functions we have devised the following construction: K is a ring member which is secured to one of the plates G by suitable means such as the bolts L. This member has a horizontal flange K' with grooves $K^2$ therein for engaging with annular disks M' of a clutch M. This clutch as before stated is carried by the drum F which in turn is connected to the gear wheel D while weighted levers N are centrifugally actuated to apply friction to the clutch when rotating at sufficient speed. In addition to the flange K' the member K is provided with a radially inwardly extending flange K³ which is provided at its inner periphery with a series of pockets K⁴ for receiving rollers O. These rollers travel upon stationary annular race member P which is mounted upon a partition wall Q of the housing Q' enclosing the gearing. The pockets K⁴ are provided with an inclined bearing K⁵ so positioned that any rotation of the member K in a direction reverse to the forward driving direction of the gearing is prevented by the wedging of the rollers O against said inclined faces. Thus the construction constitutes a one way clutch or brake permitting the member K to revolve in a forward direction but locking it from reverse rotation.

The member K is further provided with a cylindrical flange K⁶ projecting oppositely from the flange K' and provided on its inner face with a series of ratchet teeth K⁷. These teeth are adapted to engage with a locking dog or pawl R which is mounted upon a shifter fork S for controlling the reverse operation of the gearing. As the manually controlled shift gear mechanism may be of any standard construction we will refer to only a few of its elements including a gear T splined upon the shaft A², a gear T' on the shaft A and a reversing gear T³. The arrangement is such that the shifter fork engaging the gear T when moved to the left, Fig. 1, will directly couple the shafts A and A² and when moved to the right will disconnect said shafts and will engage with the reversing gear T³ to effect the driving of the shaft A² in reverse direction. It will be understood that other gears (not fully shown) communicate motion from the drive shaft A to the reversing gear. With this construction when the shifter is moved to the left the pawl R is out of engagement with the ratchet teeth K⁷ but when moved to the right will be engaged with said ratchet teeth.

It will be observed that the single member K forms an element of several mechanisms, each performing a distinct function. In the first place, it is a member of the one way clutch or brake which permits the gear carrier G to rotate in a forward direction but prevents reverse rotation; second, it is a member of the friction clutch M which rotates the gear carrier at varying speeds from the driven gear D; third, it forms a ratchet wheel for cooperating with the locking pawl that holds the gear carrier G from forward rotation when the shift gearing is in reverse. Thus the construction of the transmission is simplified by the use of this single member for the performance of the several distinct functions.

The pawl R must be capable of engaging the ratchet wheel K⁶ in whatever position the latter may stand. To this end it is provided with a shank R' which is pivotally attached to a pin S' on the gear shifter S. It is also provided with a spring pressed plunger R² which yieldably presses it against the ratchet teeth, while the inportion of the pawl which engages said ratchet is correspondingly beveled and is provided with a beveled nose piece R³ for engagement therewith. Thus when the shifter fork S is moved to the right, Fig. 1, the beveled nose R³ of the pawl will enter into engagement with the ratchet teeth K⁷, the spring pressed plunger R² permitting the yielding of the pawl to ride into full engagement, even where the projecting end of the ratchet tooth is in registration with the pawl. During this movement the plunger R² travels over a guide Q² which is mounted upon a partition wall Q of the housing Q'.

To insure the instantaneous locking of the over-running clutch when subjected to any reverse rotation torque, the rollers are held in engagement with the inclined bearings K³ by a spring pressed plunger U. These are mounted in lugs U' on an annular member U² which has a flange U³ bolted or otherwise secured to the member K.

In operation, when the shaft A is rotated in a direction to drive the vehicle forward, it will cause the sun gear B to transmit motion through the intermediate ring gear C to the internal gear D, driving the latter and the driven shaft E in the same direction but at a slower speed and with greater power. The reaction of the load against the gear carrier G tends to drive the latter in the reverse direction but due to the instantaneous engagement of the rollers O with inclined bearings K³, such reverse rotation is prevented.

As the speed of the vehicle increases a corresponding acceleration in the rotation of the gear wheel D will cause the weighted arms N to be thrown outward by centrifugal action. This will place a pressure upon the friction disks M' which are alternately connected to the member K and to the drum F. This friction will drive the member K and carrier G in a forward direction which is permitted by the overrunning clutch but which initially is at a speed slower than the speed of the gear wheel D. However, as centrifugal force increases, the speed of rotation of the carrier G will be increased until finally it will be coupled to rotate at the same speed as the driven shaft, thereby constituting a direct drive.

When the transmission is in reverse, the movement of the gear shifter S towards the right, Fig. 1, will engage the pawl R with the ratchet tooth K⁷, so that the reaction of the load upon the gear carrier G which tends to drive said carrier in a forward direction, will only cause a locking of a ratchet tooth with the pawl and will prevent any further rotation. This will render the intermediate ring gear C effective in transmitting reverse rotation of the sun gear B to the internal gear D and driven shaft E connecting therewith.

Any suitable control mechanism may be used for operating a shifter S but as shown V is a rotatable and longitudinally slidable shaft carrying a gear segment V' which is in mesh with a rack V² on the gear shifter S. The gear segment V' may also engage a rack W on the shifter W' for actuating the other shiftable gears of the transmission (not shown in detail).

What we claim as our invention is:

1. In a transmission gearing, the combination with a drive member, a driven member and an intermediate member, of reversing mechanism between said drive member and intermediate member, a shifter for operating said reversing mechanism, planetary gearing between said intermediate member and driven member including a planetary gear carrier, means cooperating with said gear carrier to hold the same from rotation in one direction while permitting free rotation in the opposite direction, an annular toothed flange projecting from the peripheral portion of said gear carrier, and a dog operated by the movement of said shifter into reverse driving position for engaging said toothed flange to hold said carrier from rotation in the direction permitted by said means.

2. In a transmission gearing, the combination with a drive member, a driven member and an intermediate member, of reversing mechanism between said drive member and intermediate member, a shifter for operating said reversing mechanism, planetary gearing between said intermediate member and driven member including a planetary gear carrier, means cooperating with said gear carrier to hold the same from rotation in one direction while permitting free rotation in the opposite direction, a friction clutch between said gear carrier and driven member, said gear carrier forming an element of said friction clutch provided with an oppositely extending toothed flange and a dog for engaging said toothed flange to lock said carrier from rotation in the direction permitted by said means, said dog being actuated into such position by the movement of said shifter to reversing position.

3. In a transmission gearing, the combination with a drive member, a driven member and an intermediate member, of reversing mechanism between said drive member and intermediate member, a shifter for operating said reversing mechanism, planetary gearing between said intermediate member and driven member including a planetary gear carrier, means cooperating with said gear carrier to hold the same from rotation in one direction while permitting free rotation in the opposite direction, a friction clutch between said carrier and driven member, a single member on said carrier forming an element of said friction clutch and of said means and also provided with a projecting annular toothed flange, a dog for engaging said toothed flange to lock said carrier from rotation in the direction permitted by said means, and a connection between said shifter and dog whereby the latter is normally out of engagement with said toothed flange and is moved into engagement therewith by a movement of said shifter for reversing direction of drive between said drive and intermediate members.

4. In a transmission gearing, the combination with a drive member, a driven member and an intermediate member, of reversing mechanism between said drive member and intermediate member, a shifter for operating said reversing mechanism, planetary gearing between said intermediate member and driven member including a planetary gear carrier, means cooperating with said gear carrier to hold the same from rotation in one direction while permitting free rotation in the opposite direction, a multiple disk friction slip clutch between said gear carrier and driven member, a member secured adjacent to the periphery of said gear carrier having a portion forming an element of said friction clutch, a radially inwardly extending portion forming an element of said means, and an annular internally toothed flange projecting oppositely from the portion of the friction clutch and a dog mounted on said shifter actuated by a movement thereof in a direction for reversing drive between said drive and intermediate members to engage said toothed flange and to lock said carrier from rotation in the direction permitted by said means.

5. In a transmission mechanism, the combination with a drive shaft, a driven shaft and an intermediate shaft, of reversing mechanism between said drive shaft and intermediate shaft, a shifter for operating said reversing mechanism, a planetary gearing between said intermediate shaft and driven shaft including a sun gear on said intermediate shaft, an internal gear on said driven shaft, an eccentric internal external ring gear in mesh with said sun gear and internal gear, and a gear carrier for said ring gear, a multiple disk slip clutch between said gear carrier and driven shaft, means cooperating with said gear carrier permitting rotation in one direction while preventing rotation in the reverse direction, an internal toothed flange on said gear carrier, a dog actuated by the movement of said shifter into reverse position to engage said toothed flange and to lock said carrier from rotation in the direction permitted by said means, and a single member forming said internal toothed flange, a portion of said means and a portion of said friction slip clutch, said member being attached to said gear carrier.

HORACE T. THOMAS.
ALBERT B. HAYS.